United States Patent [19]
Schaar

[11] Patent Number: 6,105,612
[45] Date of Patent: Aug. 22, 2000

[54] MECHANISM FOR CONTROLLING FLUID FLOWS

[75] Inventor: Rudolf Schaar, Mitterdorf an der Raab, Austria

[73] Assignee: Tesma Motoren-und Getriebetechnik Ges.m.b.H, Preding, Austria

[21] Appl. No.: 09/277,876

[22] Filed: Mar. 29, 1999

[30] Foreign Application Priority Data

Mar. 30, 1998 [AT] Austria ........................................ 553/98

[51] Int. Cl.⁷ .................................................... F16K 24/00
[52] U.S. Cl. ............................ 137/588; 137/587; 141/59; 141/302; 123/519
[58] Field of Search ............................. 123/519; 137/588, 137/587; 141/59, 301, 302

[56] References Cited

U.S. PATENT DOCUMENTS

| | | | |
|---|---|---|---|
| 4,926,914 | 5/1990 | Morizumi et al. | 141/59 |
| 5,027,868 | 7/1991 | Morris et al. | 141/59 |
| 5,263,511 | 11/1993 | Ohasi et al. | 137/588 |
| 5,404,906 | 4/1995 | Aoshima et al. | 137/587 |

*Primary Examiner*—A. Michael Chambers
*Attorney, Agent, or Firm*—Bachman & LaPointe, P.C.

[57] ABSTRACT

Valve mechanism for controlling the fluid flows when refueling a fuel tank provided with a filler neck, having: a housing in which there are constructed a first opening, a second opening and a third opening; a valve member which is mounted movably in the housing between a first and a second position and has at least one sealing surface; a valve seat which in the housing is arranged between the openings and cooperates with the sealing surface(s) of the valve member in order, in the first position, to set up a first fluid connection between the first opening and the second opening, and a second fluid connection between the second opening and the third opening, and, in the second position, to interrupt the first and the second fluid connections; and a third fluid connection which is constructed in the housing between the second opening and the third opening and has a higher flow resistance than the second fluid connection.

5 Claims, 4 Drawing Sheets

MECHANISM FOR CONTROLLING FLUID FLOWS

BACKGROUND OF THE INVENTION

The present invention relates to a valve mechanism for controlling fluid flows when refueling a fuel tank provided with a filler neck, having: a housing in which there are constructed a first opening for connecting an operational vent line coming from the top side of the fuel tank and a second opening for connecting a fuel vapor recycling line coming from a compensating tank and/or collecting tank; a valve member which is mounted movably in the housing between a first and a second position and has at least one sealing surface; a valve seat which is arranged in the housing between the openings and cooperates with the sealing surface(s) of the valve member in order, in the first position, to set up a fluid connection between the first opening and the second opening and, in the second position, to interrupt the flow connection; and actuating means for the valve member in order to move the latter from the first position into the second position.

Such a valve mechanism is known from U.S. Pat. No. 5,404,906.

The invention relates, in particular, to such a valve mechanism which is intended for use in a refueling system, which has the following components:

a fuel tank with a filler neck, a compensating tank which is connected to the fuel tank via an ascending pipe, a collecting tank for fuel vapors which is connected, for its part, to a vent line of the compensating tank, and an operational vent line which comes from the top side of the fuel tank and is open during operation but closed during refueling, in order to fuel up in the upper region of the fuel tank an air reservoir which after refueling and upon opening of the operational vent line starts to be filled up by the fuel continuing to run from the filler neck, and thus provides the overfill prevention function for the filler neck which is known in the prior art.

It is the object of the invention to create a valve which incorporates all the fluid control functions required to operate such a refueling system as described above.

SUMMARY OF THE INVENTION

The foregoing object is achieved with the aid of a valve mechanism of the type mentioned at the beginning and which is distinguished according to the invention by the following features: a third opening which is constructed in the housing for connection to the upper end section of the filler neck, the valve seat cooperating with the sealing surface(s) of the valve member in order, in the first position also to set up a second fluid connection between the second opening and the third opening and, in the second position, also to interrupt the second fluid connection; and a third fluid connection which is constructed in the housing between the second opening and the third opening and has a higher flow resistance than the second fluid connection.

By way of the present invention, a mechanism is created which gathers together all the required control functions. Said third fluid connection creates a bypass of small diameter to the second fluid connection blocked in the tank position, with the result that fuel vapor can be recycled from the compensating tank into the fuel flow entering the filler neck, and this relieves the collecting tank. Moreover, the third fluid connection also prevents the effect, known as spill over, of a build-up of pressure in the filler neck after the fuel-pump nozzle is switched off and before it is withdrawn, which otherwise leads to fuel spurting out (spill over).

The flow resistance of the third fluid connection is expediently selected to be so large as to prevent excessive entry of recycled fuel vapor into the inflowing fuel, which latter could evade the sealing of the filler neck with respect to escaping fuel vapors through the liquid column itself prevailing in the filler neck (liquid seal effect).

An advantageous embodiment of the invention is distinguished by the fact that the sealing surface of the valve member has a notch which forms the third fluid connection. As an alternative, it can be provided that the valve seat has a notch which forms the third fluid connection. Both variants represent a particularly simple possibility in terms of production engineering for creating a bypass to the second fluid connection.

It is particularly advantageous when, in accordance with a further embodiment of the invention, the valve member has a frustoconical first sealing surface, which forms with a first valve seat in the shape of an annular edge a first valve clearance controlling the first fluid connection, and a second sealing surface, in the form of a lateral cylindrical surface, which forms with a tubular second valve seat a second valve clearance controlling the second fluid connection. This design is particularly insensitive to manufacturing tolerances since, because of its cylindrical construction, the second valve clearance permits an axial offset in the closed state. The change-over point of the valve mechanism can therefore be designed with respect to the first valve clearance, and it is impossible for a valve clearance not to be properly closed because of tolerance problems.

It is particularly advantageous in this case when the notch is constructed on the inner circumference of the tubular second valve seat.

BRIEF DESCRIPTION OF THE DRAWINGS

The invention is explained in more detail below with the aid of an exemplary embodiment represented in the drawings wherein.

DETAILED DESCRIPTION

Figure 1:
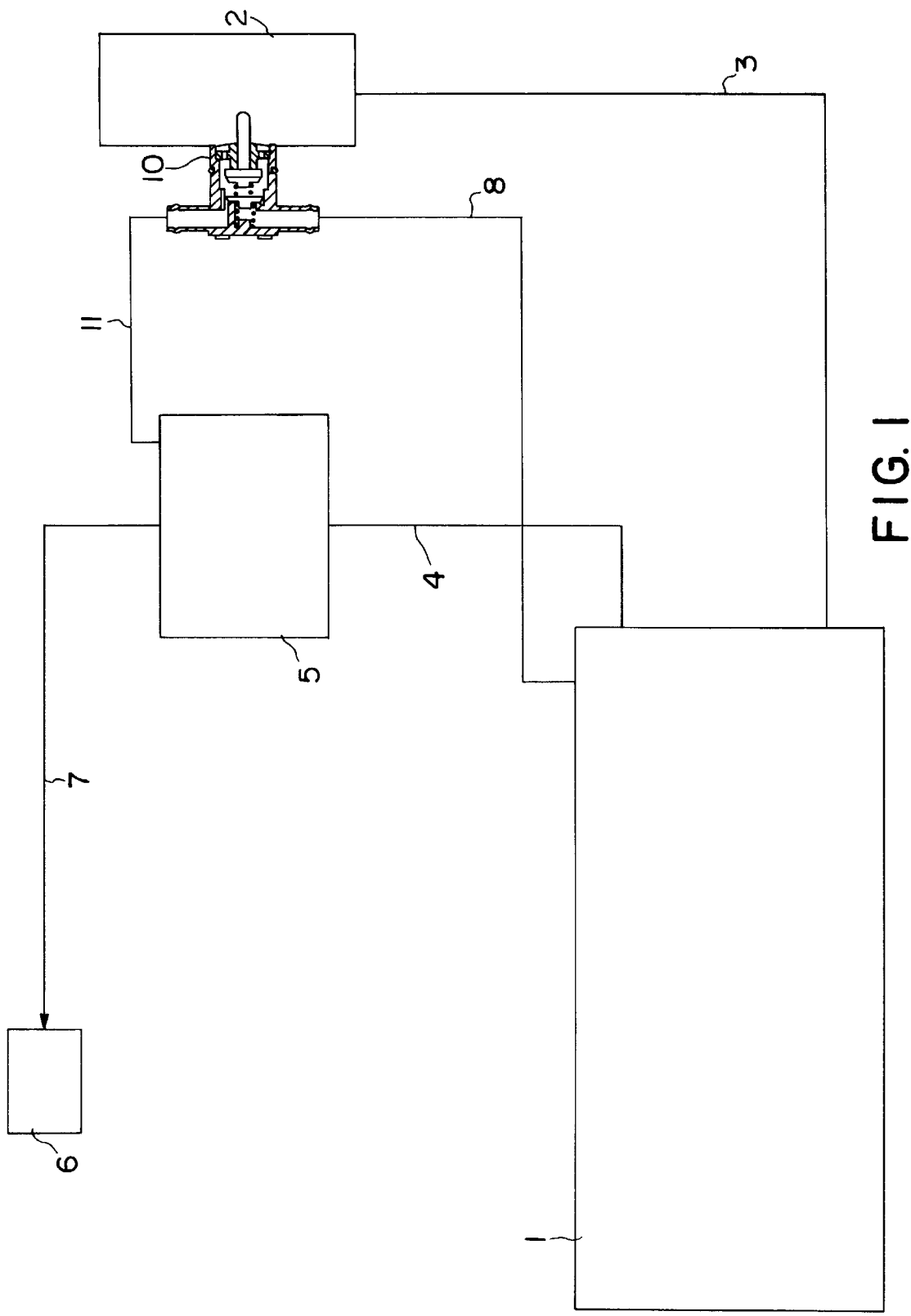
FIG. 1 shows a schematic block diagram of a refueling system in which the valve mechanism according to the invention is used.

In accordance with FIG. 1, a refueling system comprises a tank 1 which can be refueled via a filler neck 2 which is connected to the tank 1 via a filler line 3.

A compensating tank 5 is connected to the fuel tank 1 via an ascending pipe 4. The compensating tank 5 is essentially a cavity in which fuel can be collected in the case of any possible overpressure in the tank 1 (for example in the event of heating), and which also offers the fuel the possibility of "effervescing out", that is to say dissolving any gas bubbles, for example air bubbles, contained in the fuel, which were introduced during filling.

Connected to the top side of the collecting tank 5 is an extraction line 7 leading to a fuel vapor collecting tank 6.

The collecting tank 6, also termed an ORVR ("onboard refueling vapor recovery") tank, contains an element, for example active carbon, which stores fuel vapors and, during the operation of the vehicle in which the refueling system is used, it is rinsed through by the air fed to the combustion, in order to feed the stored fuel to the combustion.

Furthermore, coming from the top side of the tank 1 is an operational vent line 8 which is switchably connected to the compensating tank 5 via a valve mechanism, denoted in general by 10, and a fuel vapor recycling line 11 described in detail later. Alternatively, the recycling line 11 could lead directly to the collecting tank 6.

Figure 2:
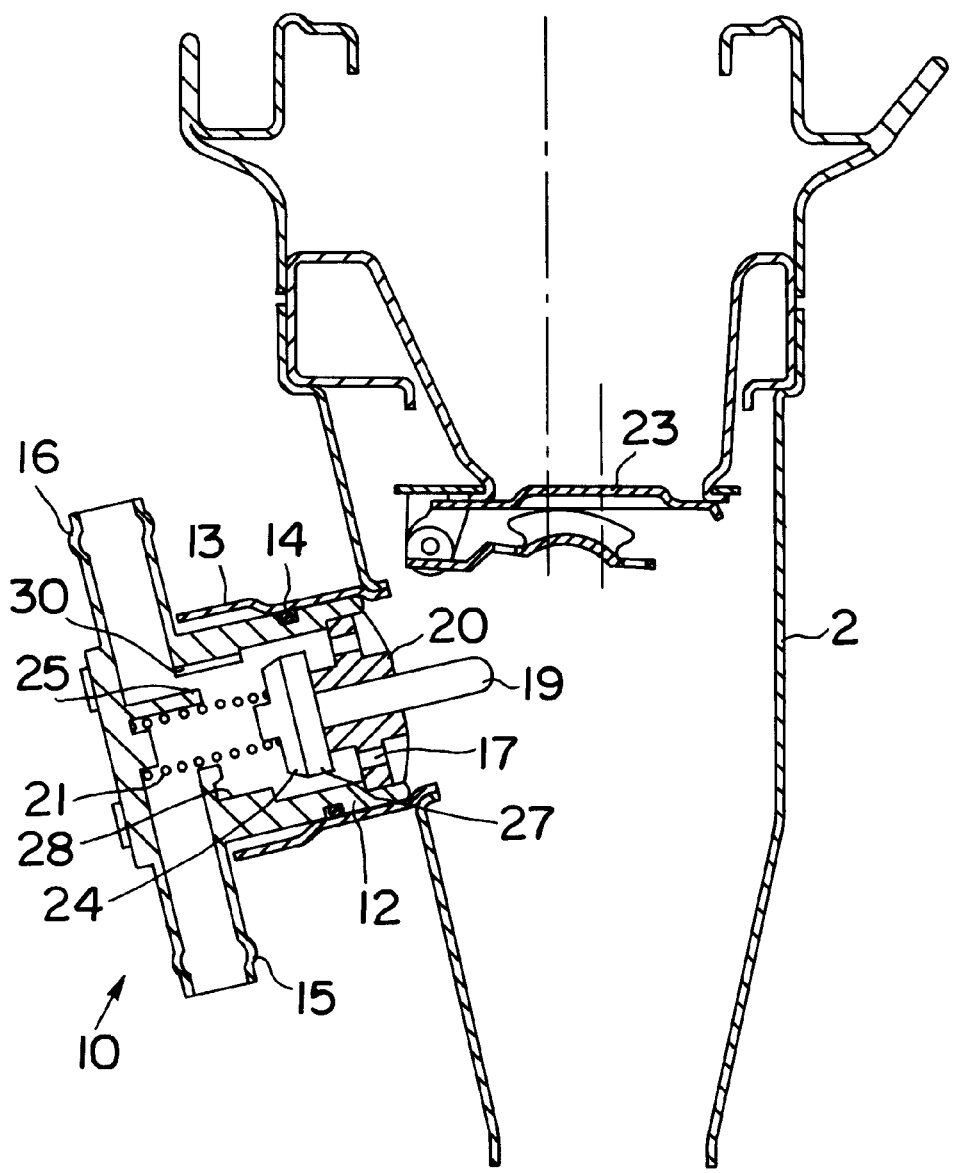
FIGS. 2 and 3 show the valve mechanism of FIG. 1 in section at the upper end of a filler neck in the operating position (FIG. 2) and the tank position (FIG. 3)
Figure 3:
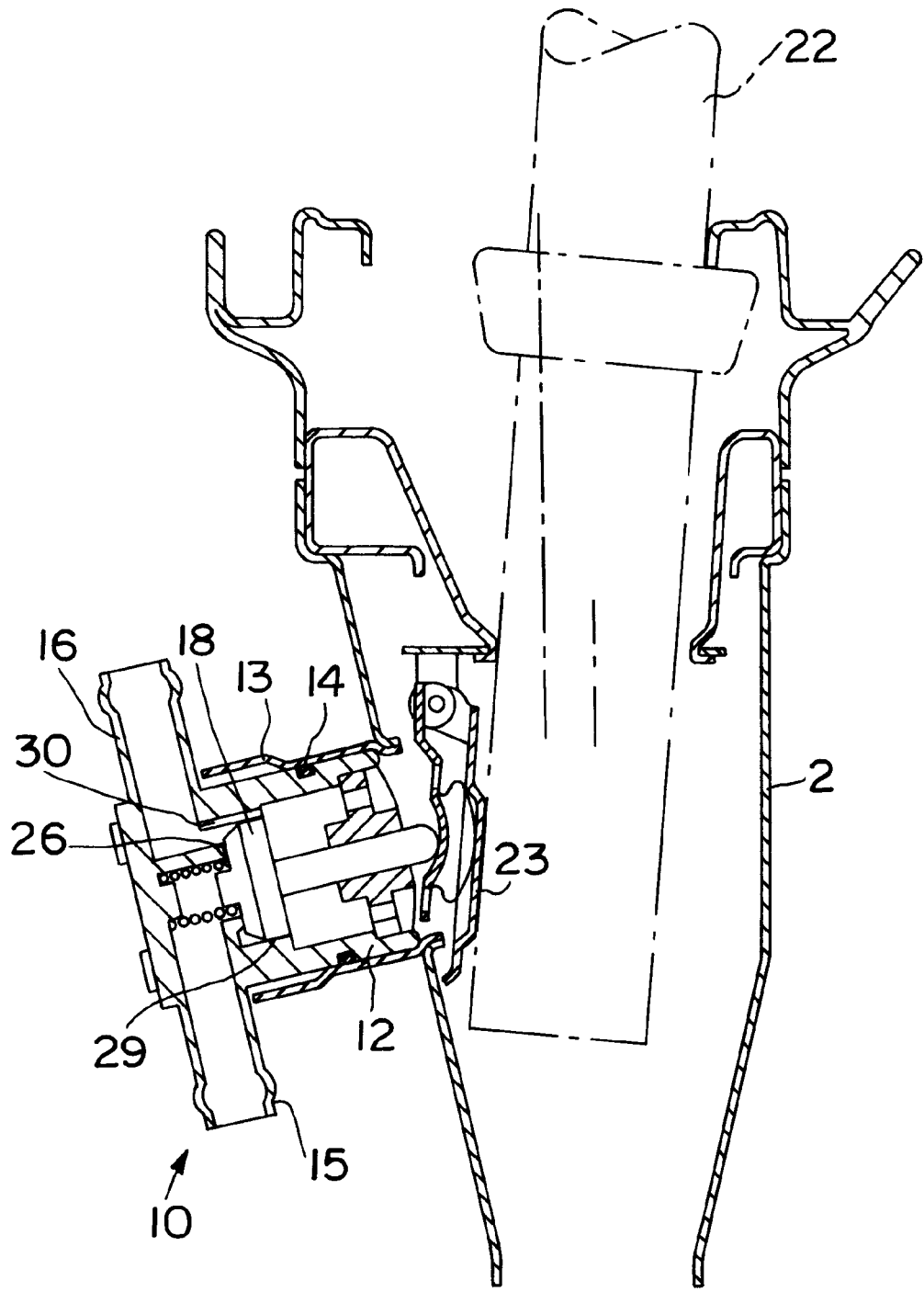

The valve mechanism 10 is represented in more detail in FIGS. 2 and 3, and is accommodated in a housing 12 which is fastened laterally on an upper end section of the filler neck 2, in the present case being tightly inserted into a flange 13 with the aid of a sealing ring 14 shrunk onto the outer circumference of the housing 12.

The valve mechanism 10 or the housing 12 is provided with three openings, specifically a first opening 15 for connecting the operational vent line 8, a second opening 16 for connecting the recycling line 11, and one (or a plurality of) third opening(s) 17 which open(s) directly into the interior of the top section of the filler neck 2.

A valve member 18 (see FIG. 3) is mounted movably in the interior of the housing 12, specifically between a first "operating position" (represented in FIG. 2) and a second "tank position" (represented in FIG. 3). The valve member 18 is moved with the aid of actuating means in the form of an axially displaceable control pin 19 from the first position into the second, which control pin 19 centrally penetrates a disk-shaped and insert base 20 of the housing 12 and projects into the interior of the filler neck 2. The base 20 also contains the third openings 17.

The valve member 18 is preloaded in the operating position shown in FIG. 2 with the aid of a compression spring 21.

The control pin 19 is actuated by inserting a filling tube 22 (FIG. 3) of a fuel-pump nozzle (not shown in more detail) into the upper end of the filler neck 2. The filling tube 22 could directly actuate the control pin 19 or, as in the case represented, a spring-loaded closure flap 23 is arranged in the entry region of the filler neck 2 such that it can be swiveled away downward, and it presses the actuating pin 19 into the housing 12 upon being swiveled.

The valve member 18 is fitted with a first, frustoconical sealing surface 24 which cooperates with a first valve seat 25 in the shape of an annular edge to form a first valve clearance 26. The valve clearance 26 is located in the flow path between the first opening 15 and the second opening 16 and sets up or interrupts a first fluid connection between these two openings.

The two openings 15 and 16 respectively open radially and diametrically opposite one another on the circumference of the housing 12 into the latter and, to be specific, the first opening 15 doing so to one side of the valve clearance 26 and the second opening 16 doing so to the other side of the valve clearance 26.

Adjacent to the frustoconical first sealing surface 24, the valve member 18 is provided with a second sealing surface 27 which is in the shape of a lateral cylindrical surface and cooperates with a second, tubular valve seat 28 to form a second valve clearance 29. The second valve clearance 29 is situated in the flow path between the third opening 27 and the second opening 16, and thus also in series connection with the first valve clearance 26 with reference to the flow path from the third opening 17 to the first opening 15.

In order to connect the recycling line 11 to the interior of the filler neck in the tank position as well, a flow bypass of small diameter is provided from the second opening 16 to the third opening 17. The bypass represents a third, permanently open fluid connection between the second and third openings 16 and 17, respectively.

Figure 5:
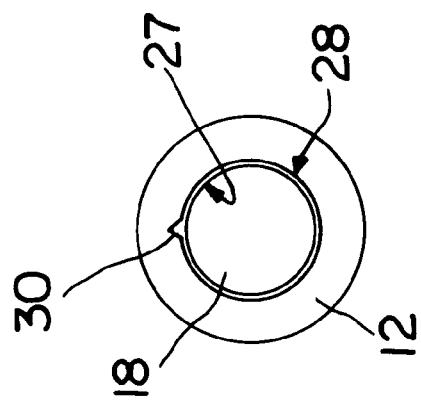
FIG. 5 shows a section through FIG. 4 along 5—5.

As third fluid connection, it would be possible, for example, to construct a channel through the wall of the housing 12 between the second opening 16 and third opening 17, or the like. However, as in the case represented it is preferred to provide the second valve seat 28 with a notch 30 (FIG. 5) so that the valve clearance 29 is bridged in the closed position (FIG. 3) by the fluid connection formed by the notch 30.

The notch 30 could alternatively also be provided in the second sealing surface 27 of the valve member 18. Instead of a notch 30, it is also possible to provide grooves, flutes, surface roughness or only an appropriately large play between the sealing surface 27 of the valve member 18 and the sealing surface of the second valve seat 28.

The valve operates in the following way.

In the operating position (FIG. 2), the valve clearances 26 and 29 are open, so that the tank 1, the operational vent line 8, the recycling line 11, the filler neck 2, the compensating tank 5 and the collecting tank 6 are interconnected and are at the same pressure.

The unimpeded pressure compensation between the components of the refueling system in the operating position, in particular also via the recycling line 11 toward the upper section of the filler neck 2, permits the use of onboard diagnosis systems which detect a possible state of overpressure in the tank system with the aid of only a single pressure sensor, for example arranged in the filler neck 2.

Figure 4:
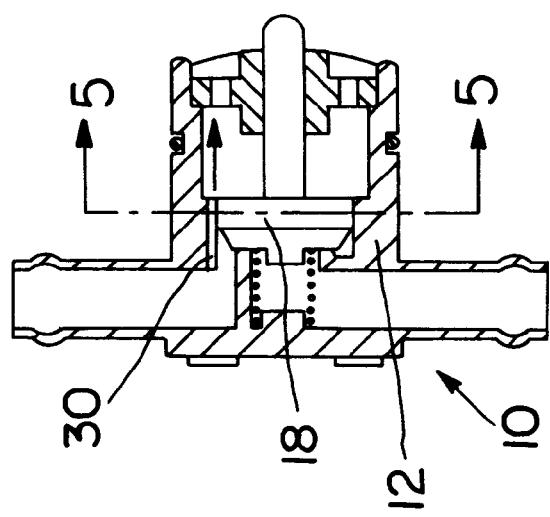
FIG. 4 shows the valve closing device in the tank position of FIG. 3, once again in section.

In the refueling position (FIGS. 3–5), the operational vent line 8 is closed and prevents escape from the air/fuel vapor reservoir contained at the uppermost point in the tank 1. During filling, the tank 1 is vented via the ascending pipe 4 into the collecting tank 6, and filling the tank is terminated as soon as the level in the tank closes the opening of the ascending pipe 4. Further incipient filling only further increases the level in the filling line 3 and in the filler neck 2, until the automatic system of the fuel-pump nozzle terminates the fuel feed.

During the incipient filling of the fuel tank 1, a portion of the flow of fuel vapor occurring in the compensating tank 5 is fed via the recycling line 11, the first opening 16, the third fluid connection 30 and the third opening 17 to the incoming fuel flow, or entrained by the wake thereof and recycled again into the tank 1.

When the fuel-pump nozzle is switched off, because the level in the filling line 3 or in the filler neck 2 becomes too high, the incoming flow of recirculation fuel vapor via the line 11 also terminates, and the third fluid connection 30 now reduces the pressure in the filler neck 2 in the opposite direction via the recycling line 11 to the compensating tank 5 or collecting tank 6. The third fluid connection thereby prevents the phenomenon, known as spill over, of fuel escaping from the end of the neck after the fuel-pump nozzle is switched off or when the latter is withdrawn. After the withdrawal of the fuel-pump nozzle, the valve mechanism 10 reverts to the operating position (FIG. 2) and opens the operational vent line 8 so that the gas reservoir remaining in the upper part of the tank 1 is vented via the line 11. Consequently, the fuel remaining in the filling line 3 and in the filler neck 2 can run back into the tank 1 (overfill prevention function).

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

It is to be understood that the invention is not limited to the illustrations described and shown herein, which are deemed to be merely illustrative of the best modes of carrying out the invention, and which are susceptible of modification of form, size, arrangement of parts and details of operation. The invention rather is intended to encompass all such modifications which are within its spirit and scope as defined by the claims.

What is claimed is:

1. A valve mechanism for controlling fluid flow when refueling a fuel tank provided with a filler neck comprising: a valve housing having a first opening for connecting an operational vent line coming from the fuel tank and a second opening for connecting a fuel vapor recycling line of a second tank; a valve member mounted movably in the housing between a first and a second position, the valve member having at least one sealing surface; a valve seat arranged in the housing between the first and second openings, said valve seat cooperates with the at least one sealing surface of the valve member wherein the valve member in the first position sets up fluid communication between the first opening and the second opening and, in the second position, interrupts the communication; actuating means for the valve member for moving the valve member from the first position to the second position; a third opening in the housing for connection to the upper end section of the filler neck, the valve seat cooperating with the at least one sealing surface of the valve member wherein in the first position a second fluid connection is established between the second opening and the third opening and, in the second position the second fluid connection is interrupted; and a third fluid connection which is constructed in the housing between the second opening and the third opening, said third fluid connection has a higher flow resistance than the second fluid connection.

2. The mechanism as claimed in claim 1, wherein the sealing surface of the valve member has a notch which forms the third fluid connection.

3. The mechanism as claimed in claim 1, wherein the valve seat has a notch which forms the third fluid connection.

4. The mechanism as claimed in claim 1, wherein the valve member has a frustoconical first sealing surface, which forms with the valve seat in the shape of an annular edge a first valve clearance controlling the first fluid connection, and a second sealing surface, in the form of a lateral cylindrical surface, which forms with a tubular second valve seat on the housing a second valve clearance controlling the second fluid connection.

5. The mechanism as claimed in claim 4, wherein the notch is constructed on the inner circumference of the tubular second valve seat.

* * * * *